J. GREEN.
Seed-Dropper.
No. 28,572. Patented June 5, 1860.
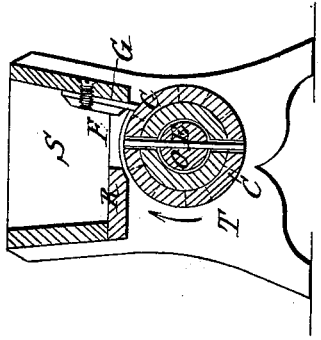
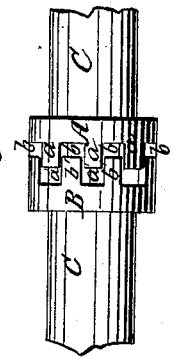
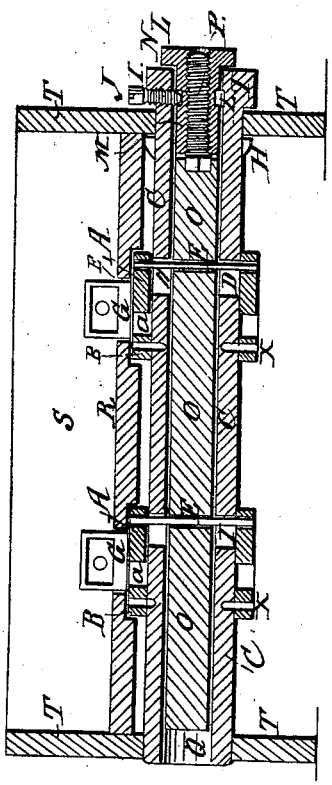
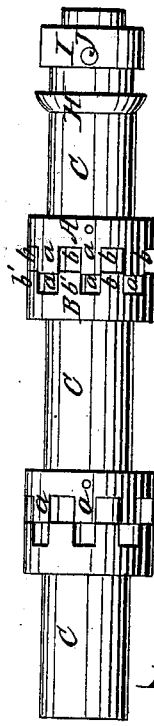
Witnesses:
Goodwin Y & Lee
R.W. Fenwick
Inventor:
James Green
by Munn & Co.
Attys

UNITED STATES PATENT OFFICE.

JAMES GREEN, OF KENNETT SQUARE, PENNSYLVANIA.

IMPROVEMENT IN SEED-PLANTERS.

Specification forming part of Letters Patent No. 28,572, dated June 5, 1860.

*To all whom it may concern:*

Be it known that I, JAMES GREEN, of Kennett Square, in the county of Chester and State of Pennsylvania, have invented a new and useful Improvement in Seed-Planters; and I do hereby declare that the following is a full, clear, and exact description of the same, reference being had to the accompanying drawings, forming a part of this specification, in which—

Figure 1 represents a central longitudinal vertical section, Fig. 2 a central vertical cross-section and Figs. 3 and 4 views of detached portions, of the machine.

Similar letters of reference in each of the several figures indicate corresponding parts.

The nature of my invention consists in the combination of stationary and sliding collars, slotted tubes, pins, rod, and grooved nut for the purpose of forming adjustable seed-distributing receptacles.

I am aware that Marton Pennock, Esq., has taken out Letters Patent for a machine designed to serve a similar purpose; but he employs two distinct devices, one (a screw and nut) for throwing the movable collar forward, so as to diminish the size of the seed-distributing receptacles, and another one (a spring) for throwing the collar back for the purpose of increasing the size of said receptacles. In my machine, however, only one device—a screw and grooved nut—serves for diminishing as well as increasing the capacity of the seed-distributing receptacles, thereby making the machine simpler, cheaper, and less liable to get out of order, and doing away with the use of springs, which are always objectionable in machines which are in every day use and exposed to rough handling.

To enable others skilled in the art to make and use my invention, I will proceed to describe its construction and operation.

S is the hopper for containing the seed. It has a number of holes, F, in its bottom R for the passage of the seed. Revolving seed-distributing receptacles, hereinafter to be described, are arranged under each of the holes F, and that side of each hole F against which the said receptacles revolve (see arrow in Fig. 2) is provided with an elastic strip, G, the lower edge of which is in contact with the surface of the collars forming the seed-distributing receptacles. Thus no seed can escape over the surface of said collars except what is contained in the receptacles.

Underneath each of the holes F there are two collars, A B, the projections $a$ of collar A fitting into recesses $a'$ in collar B, and projections B' of collar B into recesses $b$ in collar A. The collar B is fastened to a tube, C, by one or more pins, X, while the collar A slides upon said tube. A pin, E, passes through the collar A and two slots, D, in the circumference of tube C, thus limiting the play of the movable collar A to the length of said slots, which latter is about equal to the length of the projections $a\ b'$ and depth of recesses $a'\ b$ of the collars. The pin E passes also through a rod, O, which is inserted in the hollow space Q of tube C. Thus the rod O can be moved back and forth within the tube C the extent of slots D, but it cannot turn within the tube. The rod O terminates into a screw, P, and a nut, M, which fits loosely in the end of tube C, screws onto said screw P. The inner end of a screw or pin, J, inserted through the collar I of tube C, projects into a circular groove, L, in the surface of nut M. Thus it will be seen the nut M can be turned round, but is prevented from being withdrawn from, or from being moved backward or forward in, the end of tube C by the end of screw or pin J taking into the groove L. On turning the nut M either way it will screw onto or unscrew from the screw P, and thereby move the rod O, and with it the collar A, forward or backward, so as to enlarge or diminish the size of the receptacles formed by the projections $a\ b'$ and recesses $a'\ b$ of the collars A B.

The tube C is held in bearings in the sides T of the seed-planter, and may be revolved by any suitable means so as to drop the seeds contained in the said receptacles onto the ground.

Whenever the collars A B forming the seed-distributing receptacles should become too much worn or otherwise injured and unfitted for use they can easily be removed by simply withdrawing the pins X E, and be replaced by new ones, while in the machine of Morton Pennock (above referred to) the screw-spindle, together with the collars, must be thrown away whenever the latter become unfit for use.

What I claim as my invention, and desire to secure by Letters Patent, is—

The combination of stationary and sliding collars A B, slotted tube C, pins E, rod O, and grooved nut M N, for the purpose of forming adjustable seed-distributing receptacles, substantially as set forth.

JAMES GREEN.

Witnesses:
CALEB S. WICKERSHAM,
WILLIAM A. CLOUD.